Sept. 6, 1966
T. LODE
3,271,669
ALTERNATING CURRENT DIODE LOOP CAPACITANCE MEASUREMENT CIRCUITS
Filed Dec. 4, 1962
5 Sheets-Sheet 1
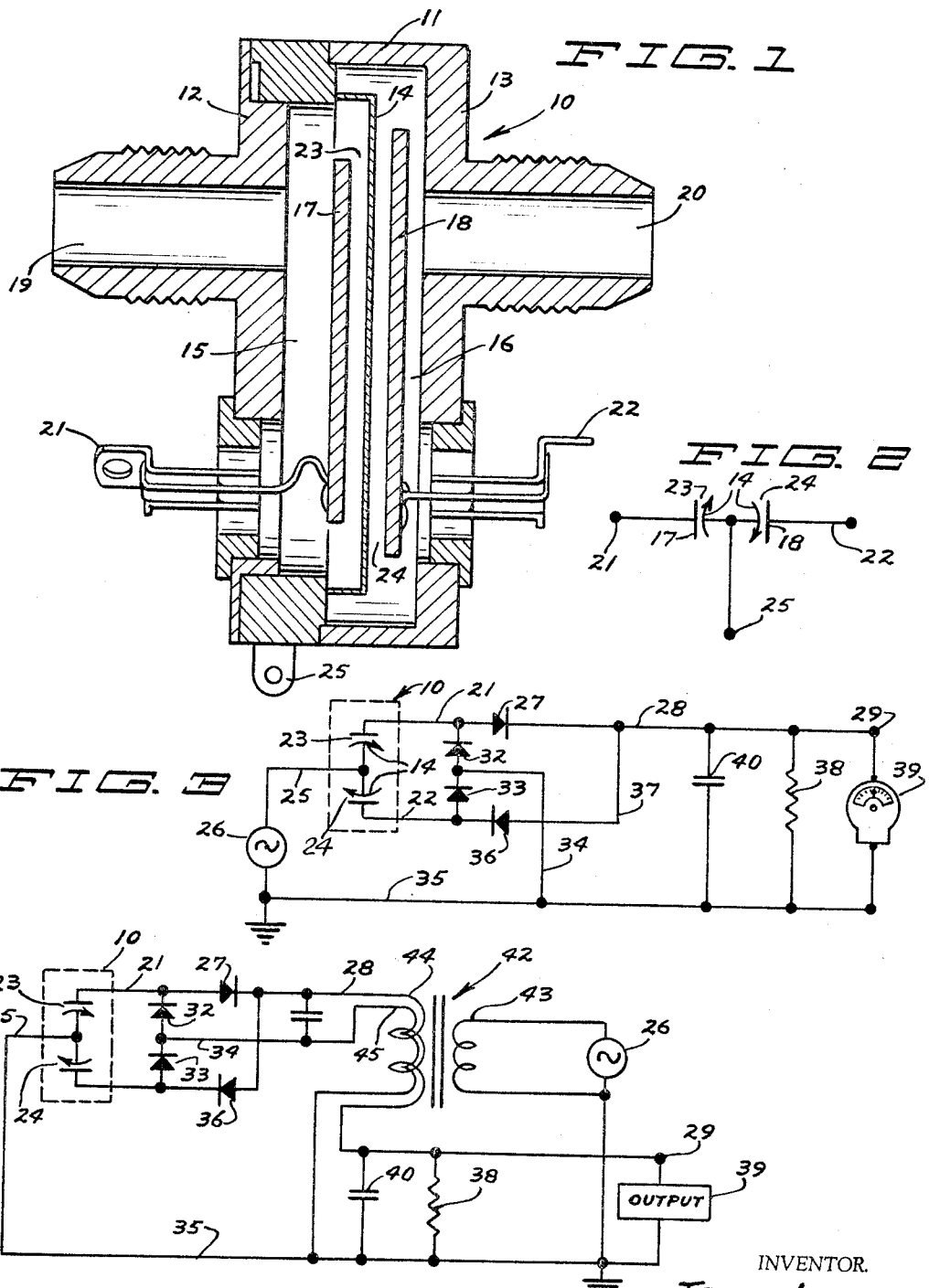
INVENTOR.
TENNY LODE
BY
Dugger Braddock Johnson + Westman
ATTORNEYS Sept. 6, 1966 T. LODE 3,271,669
ALTERNATING CURRENT DIODE LOOP CAPACITANCE MEASUREMENT CIRCUITS
Filed Dec. 4, 1962 5 Sheets-Sheet 2
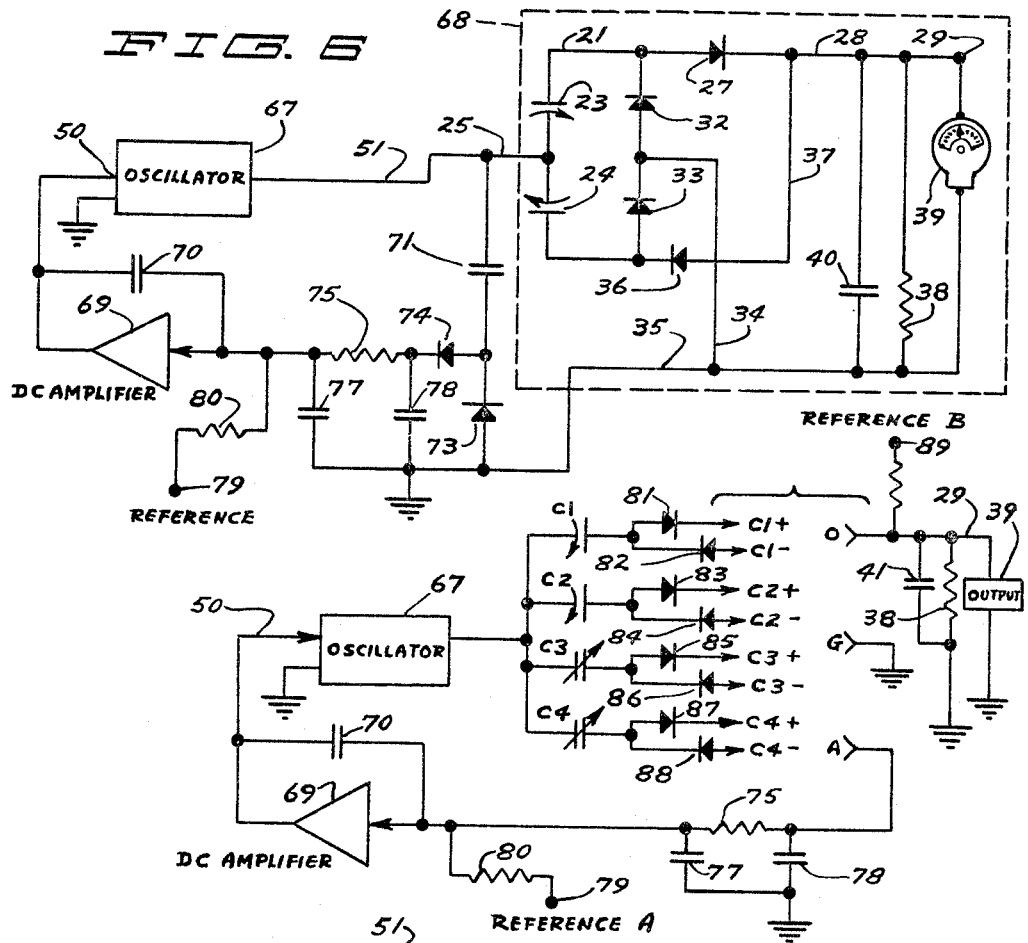
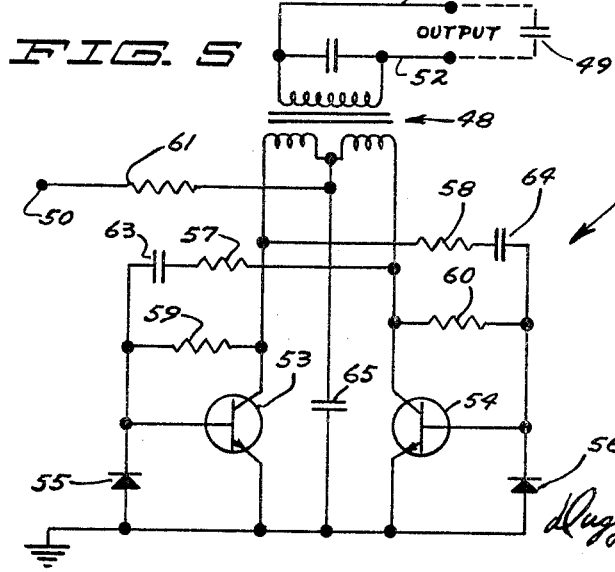
INVENTOR.
TENNY LODE
BY Dugger, Braddack, Johnson + Westman
ATTORNEYS Sept. 6, 1966  T. LODE  3,271,669
ALTERNATING CURRENT DIODE LOOP CAPACITANCE MEASUREMENT CIRCUITS
Filed Dec. 4, 1962  5 Sheets-Sheet 3
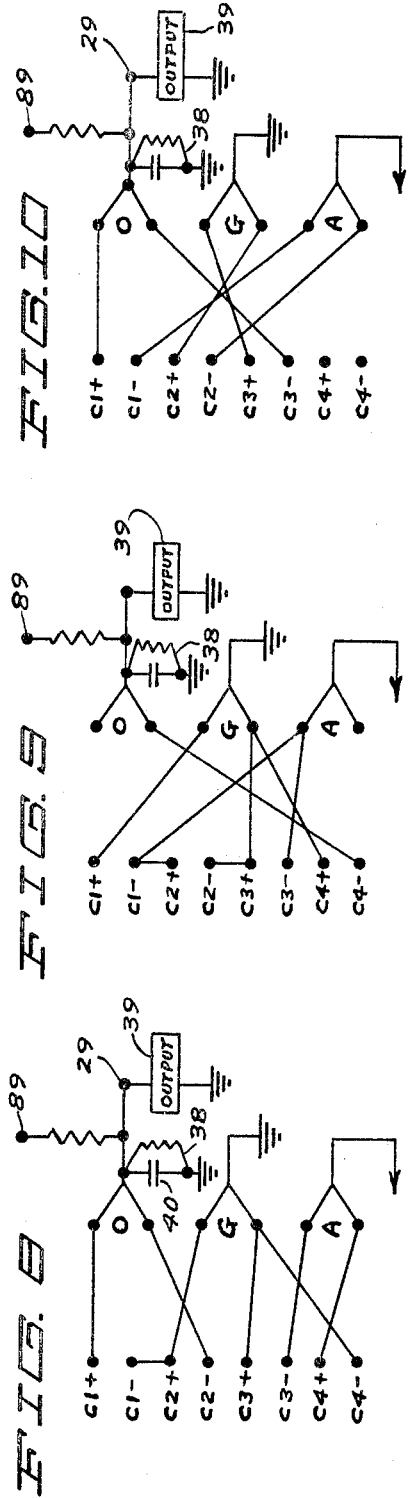
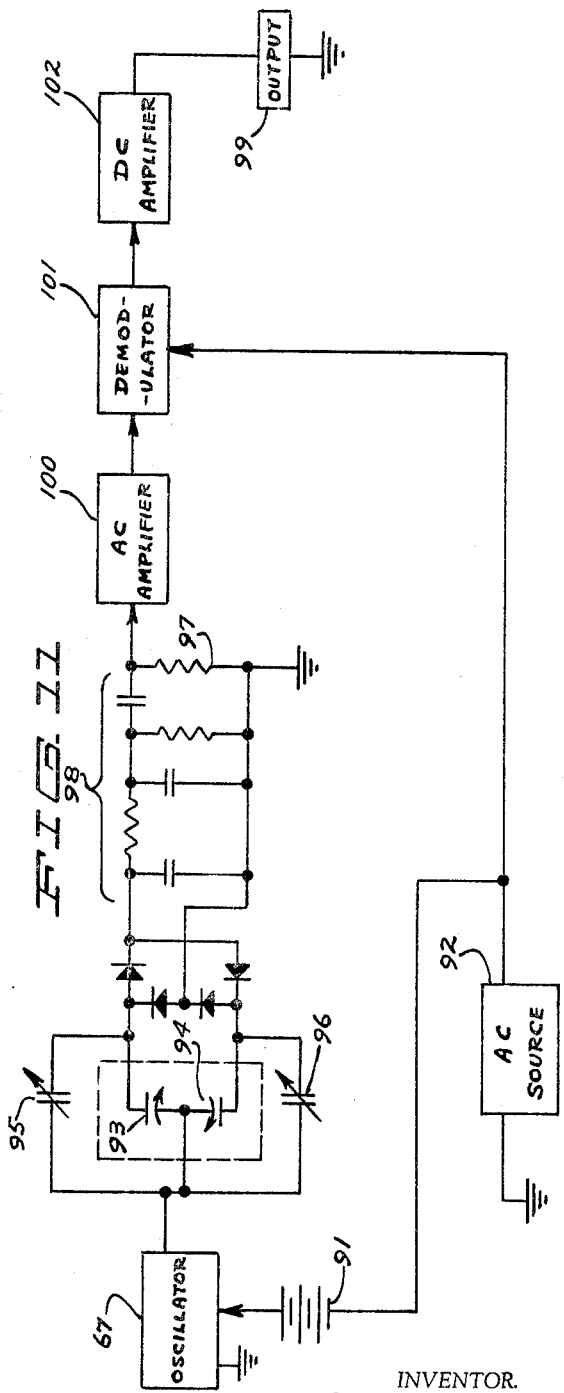
INVENTOR.
TENNY LODE
BY
Dugger Braddock Johnson & Westman
ATTORNEYS

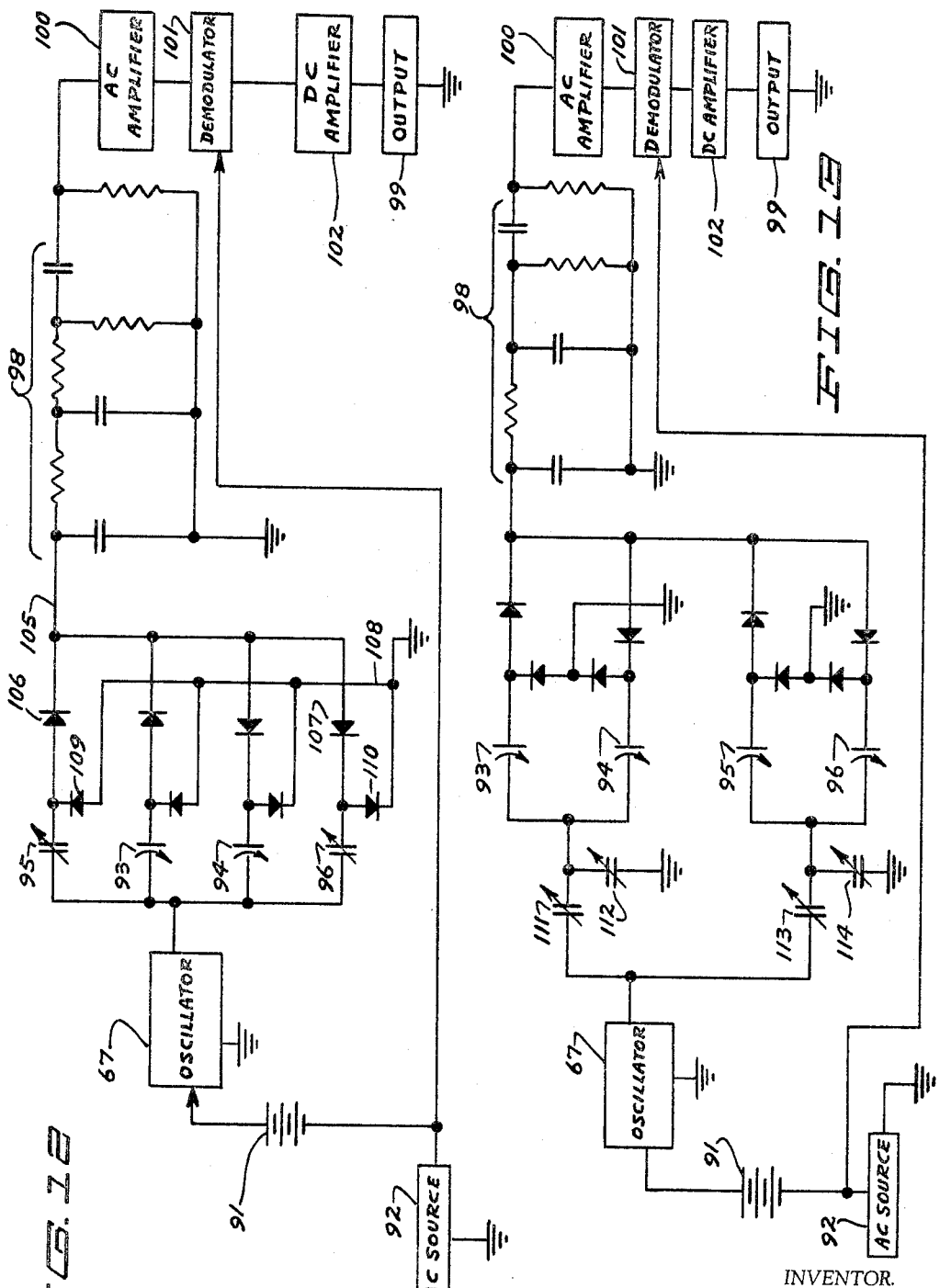

Sept. 6, 1966             T. LODE             3,271,669
ALTERNATING CURRENT DIODE LOOP CAPACITANCE MEASUREMENT CIRCUITS
Filed Dec. 4, 1962             5 Sheets-Sheet 5
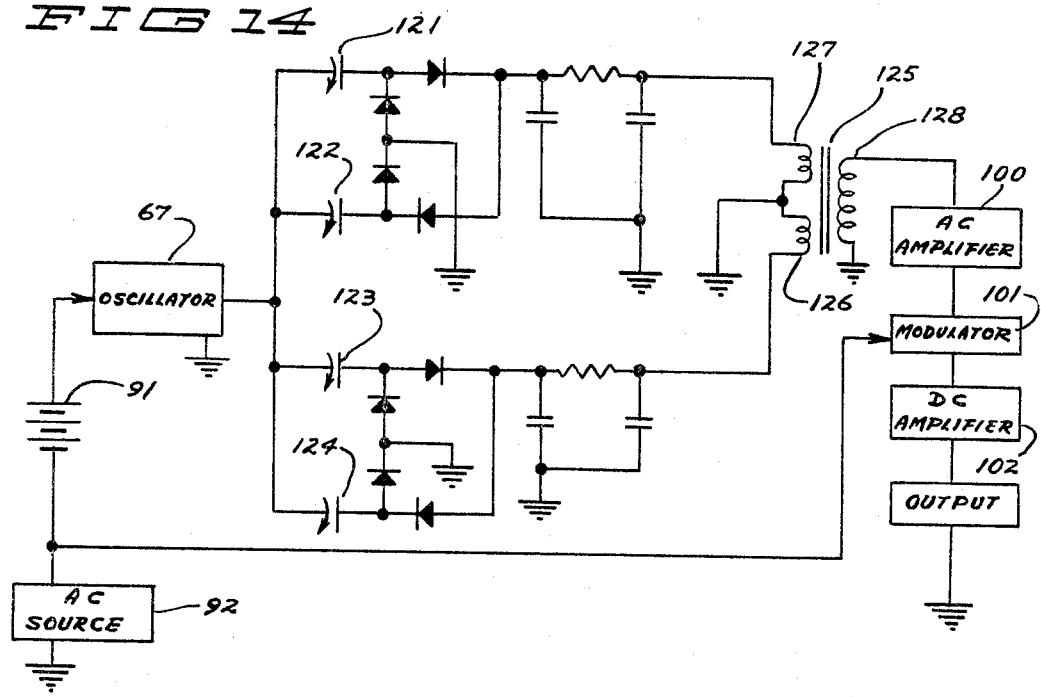
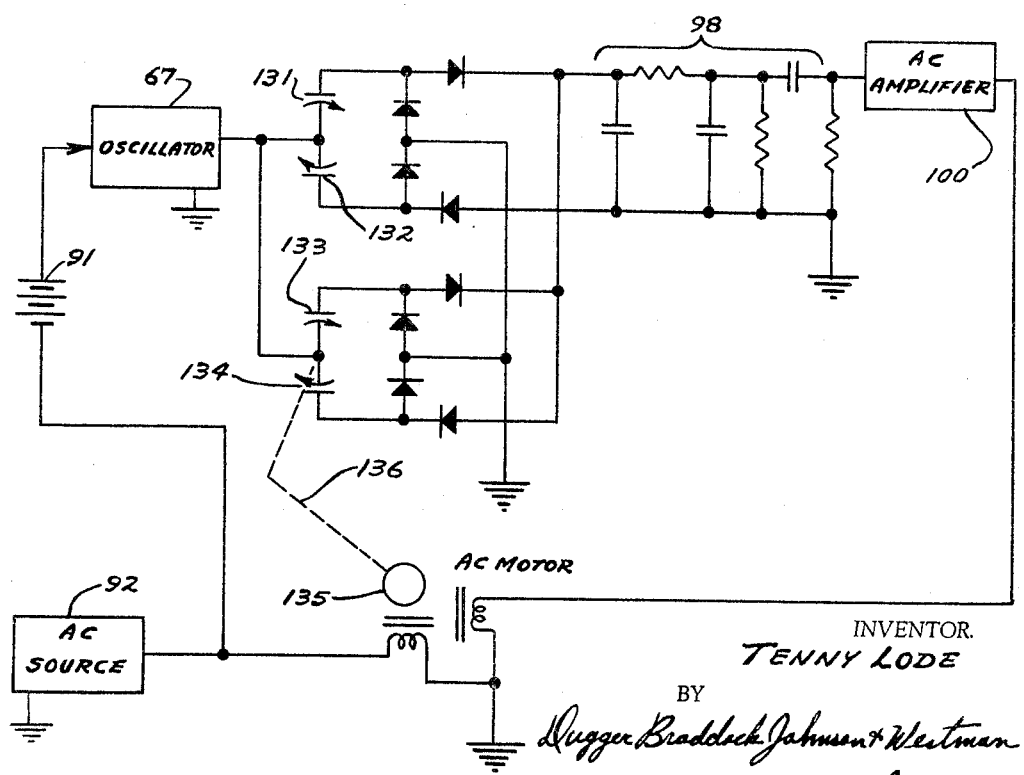
INVENTOR.
TENNY LODE
BY
Dugger Braddock Johnson & Westman
ATTORNEYS United States Patent Office 3,271,669
Patented Sept. 6, 1966

3,271,669
ALTERNATING CURRENT DIODE LOOP CAPACITANCE MEASUREMENT CIRCUITS
Tenny Lode, Mankato, Minn., assignor to Rosemount Engineering Company, Minneapolis, Minn., a corporation of Minnesota
Filed Dec. 4, 1962, Ser. No. 242,166
22 Claims. (Cl. 324—60)

This invention has relation to circuits for the precise comparison and measurement of small capacitances and small changes in capacitance. In circuits constructed according to the invention, high frequency voltages are supplied across two or more such capacitive elements to be measured and compared, and the resulting high frequency currents flowing in these elements are subjected to rectification and are combined, the resulting circuit outputs being functions of these rectified D.C. or low frequency currents and, therefore, functions of the capacitances being compared.

Transducers or sensor gages have been developed which measure pressure in terms of two electrical capacitances. Such transducers can have two spaced apart, fixed, parallel condenser plates and a movable condenser plate situated therebetween, this movable plate taking the form of a thin flexible metal diaphragm separating two pressure chambers in each of which one of the fixed plates is situated. Any difference in pressure between the chambers will cause the diaphragm to deflect toward the lower pressure, thereby changing the electrical capacitances between the diaphragm and the two fixed plates.

The accurate measurement of the relatively small capacitance differences which are developed in the use of such a gage with the circuits available before this invention presented certain problems. For example, capacitors in the desired working range of capacitance must be measured either as high impedances at moderate frequencies, such as 400 cycles per second, or must be measured at higher frequencies. The measurement of high impedances may be difficult because of problems of stray circuit impedances, such as undesired capacitances between various portions of the measuring circuit and to ground. Previously known high frequency bridge circuits suffer either from excessive error, undesirable complexity if manual balancing is to be avoided, or both. It is an object of this invention to overcome these problems.

Among the objects of the invention are the following:
(1) To provide a capacitance measurement circuit yielding directly a D.C. or low frequency output;
(2) To provide a capacitance measurement circuit which is insensitive to stray capacitances to ground;
(3) To provide a capacitance measurement circuit which can be used to precisely compare two or more capacitances with each other; and
(4) To provide circuit means whereby any one of a number of different output voltage and current functions of one or more variable capacitances can be generated as desired.

While the invention is described herein in relationship to a pressure sensitive transducer, it is to be understood that other capacitances can be compared and measured with equal facility; the particular embodiments being by way of example only. Many other variations will be possible within the spirit of the invention and the scope of the claims which follow.

In the drawings,
FIG. 1 is a vertical sectional view of one form of device which can be used in connection with the circuits of the invention, and as shown, this device is an electro-mechanical transducer for measuring pressure in terms of electrical capacitance;
FIG. 2 illustrates the equivalent electrical circuit of the transducer of FIG. 1 and the equivalent electrical circuit of many other capacitances which can be measured and compared using the circuit of the invention;
FIG. 3 illustrates a basic circuit of the invention;
FIG. 4 illustrates a modification of FIG. 3 which allows the center plate of the two capacitances to be grounded for mechanical convenience;
FIG. 5 is a schematic diagram of a preferred simple oscillator for use with variable capacitors of the invention in a resonant frequency determining circuit;
FIG. 6 is a schematic diagram of the basic circuit of FIG. 3 used with an oscillator such as the one in FIG. 5 as the source of alternating current and disclosing a regulator circuit for controlling the frequency amplitude product coming from the oscillator;
FIG. 7 is a schematic diagram of a generalized form of a circuit made according to the invention designed to obtain electrical signals which are proportional to various functions of two or more capacitances;
FIGS. 8, 9 and 10 are connection charts applicable to the circuit of FIG. 7 for obtaining electrical signals which represent the certain specific funtions of the capacitances of FIG. 7;
FIG. 11 is a schematic diagram of a first modulated oscillator circuit incorporating the present invention;
FIG. 12 is a modified second form of modulated oscillator circuit utilizing the present invention;
FIG. 13 is a schematic diagram of a first ratio sensing circuit;
FIG. 14 is a schematic diagram of a modified second form of ratio sensing circuit, and
FIG. 15 is a schematic diagram of a capacitive self-balancing system embodying the invention.

Referring now to the drawings and the numerals of reference thereon, a representative capacitive pressure gage 10 as shown in FIG. 1 includes a gage body 11 which consists of first and second complementary gage body portions 12 and 13, respectively, separated by a thin flexible diaphragm 14 to define first and second pressure chambers 15 and 16, within said first and second body portions, respectively. First and second fixed plates 17 and 18 are situated within the first and second pressure chambers 15 and 16 respectively, to have parallel spaced relationship to the thin flexible diaphragm 14. First and second pressure inlet conduits 19 and 20 are open from outside of the gage body 11 to the first and second pressure chambers 15 and 16, respectively. First and second electrical connections 21 and 22 extend from the first and second fixed plates 17 and 18 respectively and are insulated from electrical connection with the case body 11 and the flexible diaphragm 14.

Any difference in the chamber pressures will cause the diaphragm 14 to deflect toward the chamber of the lower pressure; thereby changing the electrical capacitances between the diaphragm and the two fixed plates 17 and 18. Such a gage is used as a differential pressure gage by connecting the two pressure conduits to the two pressures to be compared. The gage is used as an absolute pressure gage by sealing one of the conduits 19 and 20 with a vacuum or reference pressure inside of its corresponding pressure chamber and connecting the other conduit to the pressure to be measured. Typical gages can have midrange capacitances of approximately 40 picofarads between the diaphragm 14 and each of the two fixed plates 17 and 18. At a nominal full scale pressure difference, the capacitances of such gages will be approximately 34 picofarads on one side and 56 on the other. Expressing the gage output as the difference in the capacitances to the fixed plates, the normal full scale range from lowest to highest value is approximately plus or minus 20 picofarads.

For purposes of simplicity in discussing the circuits which follow, the first fixed plate 17 and the flexible diaphragm 14 can be considered a first variable capacitor or capacitor pair 23 and the second fixed plate 18 and the diaphragm 14 can be thought of as a second variable capacitor or capacitor pair 24. A third electrical connection 25 extends from the thin flexible diaphragm 14 and, as shown, is grounded to the gage body 11, but this is not always necessary. The diaphragm 14 and the electrical connection 25 can be and preferably will be electrically isolated from the other elements of the gage in some applications and in some circuits.

FIG. 2 illustrates the equivalent electrical circuit for the capactive pressure gage 10 shown in FIG. 1.

As stated above, the accurate measurement of the small capacitance differences developed with gages of the type illustrated and with the use of simple circuits known before this invention does present some problems. For example, at 400 cycles, the impedance of a 40 picofarad capacitor is about 10 megohms. Hence, either very high impedance circuits or higher frequencies are required. Also, as previously stated, previously known high frequency bridge circuits suffer from either excessive error, undesirable complexity if manual balancing is to be avoided, or both.

The circuit of FIG. 3 is a basic form of the present invention and serves as a simple and accurate readout circuit for differential capacitance gages. For simplicity in illustration, particular values will be assigned to the components of this figure with the understanding that they are illustrative of but one of many specific embodiments of the invention. The capacitive pressure gage 10 of FIGS. 1 and 2, for example, receives the output of an oscillator or other source of alternating current energy 26 through its third electrical connection 25 to the diaphragm 14. This output can be, by way of example, a 100 kilocycle sine wave of approximately 400 volts peak to peak. First electrical connection 21 extends from the first variable capacitor 23 to a first diode 27, and an electrical output line 28 connects this diode to an output terminal 29. Second and third diodes 32 and 33 are connected in series with each other across the first and second electrical connections 21 and 22 of the gage 10, and a line 34 extends from between these diodes to a common return line or ground line 35. A fourth diode 36 is connected between the first electrical connection 22 and the electrical output line 28 by a line 37. These four diodes can be type 1N2459, or some other suitable type. The general requirement is that they be capable of rapid recovery and have a low stored charge. A filter capacitor 40 between lines 28 and 35 can typically have a capacitance of one or two microfarads; and a load resistance 38 between these lines 28 and 35 can have a resistance of a few hundred ohms or less. A center reading meter 39 or some other suitable element for reading out or for being controlled by the output of the circuit of the invention is connected from the output terminal 29 to the return line 35.

In operation, as the oscillator output voltage changes from its negative peak to its positive peak, the current charging the first variable capacitor 23 flows through the first diode 27 and is delivered as a positive current to the filter capacitor 40 and the load resistance 38. The current charging the second variable capacitor 24 is drawn through the third diode 33 and lines 34 and 35.

When the oscillator output voltage changes from its positive peak to its negative peak, the current charging the first variable capacitor 23 flows through the second grounded diode 32, and the current charging the second variable capacitor 24 is delivered as a negative current to the filter capacitor 40 and the load resistance 38. When the pressures inside of the gage are balanced, or otherwise such that the diaphragm 14 is positioned so that the capacitances between it and each of the plates 17 and 18 are the same, the positive and negative currents delivered to the filter capacitor 40 and the load resistance 38 will cancel, and the net D.C. current through the load resistance will be zero. When the gage is unbalanced, however, the magnitude and direction of the capacitance difference will be indicated by the magnitude and direction of the D.C. output current through the load resistance 38. Assuming the external load at 39 to be of low impedance, the resistor 38 may be eliminated if desired. If the load at 39 is a high impedance voltage sensing circuit, the value of the resistor 38 may be selected to give the desired voltage output for the currents generated by the circuit.

The current magnitudes are readily calculated. For example, with 50 picofarad first and second variable capacitances, a 100 kilocycle oscillator frequency, an oscillator output of 400 volts peak to peak and neglecting the conduction voltage drops of the diodes (typically of the order of 0.6 volt), the two opposing currents are:

$$(50 \times 10^{-12})(10^5)(400) = .002 \text{ amp.}$$

Similarly, assuming the load to be of low resistance and neglecting the voltage drop across it, capacitances of 40 and 60 picofarads would correspond to currents of 1.6 and 2.4 milliamperes. This 20 picofarad unbalance or difference in one direction would produce a net 0.8 milliampere positive current through the load resistance, and a 20 picofarad unbalance in the other direction would produce a net 0.8 milliampere negative current in the load resistance.

Thus, with a low impedance load, the D.C. current output of the circuit of FIG. 3 is essentially proportional to the product of the oscillator frequency, the oscillator output peak to peak voltage and the capacitance difference.

The apparent generator impedance of the circuit of FIG. 3 may be calculated by assuming a small voltage E at the output terminal 29. For balanced 50 picofarad variable capacitances 23 and 24, the rectified current due to the first capacitance element 23 is:

$$(50 \times 10^{-12})(10^5)(400-E)$$

and that due to the second variable capacitance element 24 is:

$$(50 \times 10^{-12})(10^5)(400+E)$$

The net current output is then $10^{-5}$ E, corresponding to an apparent generator impedance of 100,000 ohms.

When the voltage on the output terminal 29 is negative and of the order of twice the diode forward conduction drop, current will flow from the output line 28 through the first and second diodes 27 and 32 to ground. Similarly, when the output voltage is positive and of the order of twice the diode forward conduction drop, current will flow to ground through the third and fourth diodes 33 and 36. The circuit output voltage is thus limited to magnitudes less than twice the diode conduction voltage drop, and must be used as either a current source feeding into a low impedance load or as a generator of small voltages.

Considering the circuit further, stray capacitance between the connection 25 (and the gage body 11, as shown), and ground will load the oscillator output but will not otherwise influence the circuit D.C. current output. The peak voltage on the two fixed gage plates 17 and 18, and hence across the diodes, is normally limited by the forward conduction voltage drop of the diodes. In the case of silicon junction diodes, for example, this voltage drop is approximately 0.5 to 0.7 volt. This limits the inverse voltage across the diodes to the order of 1 volt, and this makes the circuit relatively insensitive to the capacitance between the fixed plates and ground because of the low alternating voltage on the fixed plates with respect to ground.

Referring now to FIG. 4, a circuit is presented which is a modification of the circuit of FIG. 3 to allow the gage body 11, the flexible diaphragm 14 and the third electrical connection 25 to be grounded for mechanical convenience. The various elements of FIG. 3 are repeated in FIG. 4. In addition, a transformer 42 includes a primary winding 43 connected across oscillator 26, a first secondary winding 44 is connected between output line 28 and ground 35, and a second secondary winding 45 is connected between second and third diodes 32 and 33 and ground 35. Secondary windings 44 and 45 will normally be wound with an equal number of turns. The operation of the circuit of FIG. 4 is essentially similar to the operation of the circuit of FIG. 3.

For comparison or null measurements, in which the direction of capacitance unbalance must be determined but the magnitude of the unbalance need not be accurately measured, it is not necessary to precisely control the frequency or output amplitude of the oscillator of FIG. 3. However, since the D.C. output current of the circuit of FIG. 3 is proportional to the product of the oscillator frequency and peak to peak output voltage, it is desirable or necessary to stabilize this product for accurate measurement of the magnitude of capacitance difference.

Regulation of the frequency and amplitude individually regulates their product. It is possible to use a crystal oscillator for accurate frequency control plus a separate amplitude regulating circuit. However, to provide a small compact circuit, it is desirable to drive the variable capacitors of the gage in a resonant circuit. The resultant high efficiency allows a compact, low heat dissipation oscillator. For this reason I have used a simple oscillator in which the variable capacitors of the gages are part of a resonant frequency determining circuit, and have controlled the amplitude where necessary to obtain the desired product of frequency and amplitude.

An oscillator 67 which I have used for this purpose is illustrated in FIG. 5. In this circuit, an output transformer 48 is designed to resonate at approximately 100 kilocycles with a 1,000 picofarad load. For example, if the total capacitance of the variable capacitors such as 23 and 24 of FIG. 3 and/or the other load elements is 200 picofarads, then an additional 800 picofarad capacitor is placed across the oscillator output terminals 51 and 52 to bring the total to 1,000 picofarads. The total capacitance of the output circuit as impressed on the oscillator output as indicated in dotted lines at 49. Other elements of this circuit and typical working values include a D.C. power source 50 and transistors 53 and 54. Type RT5212 transistors obtained from Rheem Semiconductors have been found to be satisfactory. Their general characteristics are: silicon NPN; 60 volts peak from the collector to the base or emitter; common emitter low frequency current gain about 30; and grounded base frequency cutoff approximately 5 megacycles. The circuit also includes diodes 55 and 56 which can be of type 1N2459 and are employed to limit the inverse emitter to base voltage and to reset the coupling capacitors for the next pulse. A principal requirement for the particular circuit constant given here is a recovery time of the order of 0.5 microsecond or less. Resistors 57 and 58 can have a value of 1,000 ohms each; while resistors 59 and 60 can have a value of 100,000 ohms each. Resistor 61 has a value of 10 ohms. Capacitors 63 and 64 can have a capacitance of 0.1 microfarad while capacitor 65 can be 2 microfarads. The output voltage of this circuit as set out in the foregoing example will be approximately 400 volts peak to peak with an input of 15 volts D.C. at approximately 0.15 ampere.

The D.C. power source 50 can be a battery supplying +15 volts in null sensing applications. For precise measurements of capacitance difference, however, the D.C. voltage supplied to the circuit of FIG. 5 at 50 will be controlled so as to obtain the desired frequency amplitude product by varying the output amplitude. A regulator circuit which I have developed to accomplish this is illustrated in FIG. 6. In this figure, the oscillator 67 can be the oscillator of FIG. 5 and the load 68 is shown as the circuit of FIG. 3, although more than one such capacitance comparison circuit could be used as such a load. The D.C. amplifier 69 is an inverting amplifier of the type frequently employed in analog computing, simulation and control systems, capable of supplying the voltage and current power requirements of the oscillator circuit. A capacitor 70 can have a 0.47 microfarad capacity, for example, and is conected across the D.C. amplifier 69 to provide filtering and smoothing to stabilize the system. A capacitor 71 of 220 picofarads is associated with diodes 73 and 74 which can be type 1N2459, a 100 ohm resistor 75, two 0.47 microfarad capacitors 77 and 78, all to serve as a "dummy" gage developing approximately 9.0 milliamperes at the nominal frequency of 100 kilocycles and amplitude of 400 volts peak to peak. A —9 volt reference voltage which can be derived from a Zener reference element (not shown) is applied to the circuit at 79 through a 1,000 ohm resistor 80. This reference voltage may be supplied in any other convenient manner, however.

For a zero input voltage to the D.C. amplifier 69, the current flowing through the resistor 80 will be 9 milliamperes and will oppose and cancel the 9 milliampere current flowing through the resistor 75. If the frequency and amplitude product of the oscillator output should increase so that the rectified current flowing through the resistor 75 increases, the resulting positive signal to the input of the D.C. amplifier 69 will cause the output voltage of the D.C. amplifier to be reduced and the oscillator output amplitude to be correspondingly reduced. Similarly, if the oscillator frequency and output amplitude product falls below the normal value, the rectified current through the resistor 75 will decrease, a negative signal will be applied to the input of the D.C. amplifier, the power supply voltage supplied to the oscillator 67 will be increased, and the oscillator output amplitude increased. Thus the system of FIG. 6 is a feed back system which maintains the rectified current output of the dummy gage, and hence the product of the frequency and amplitude of the oscillator output, at a desired value.

The regulation or stabilization of the oscillator output by the current generated by the capacitor diode network of FIG. 6 is a particularly desirable way of stabilizing the oscillator output, because the regulating circuit will respond to the oscillator output in essentially the same manner as the measurement circuits whose outputs are to be stabilized. In the particular experimental model described above and shown in FIG. 6, and with an oscillator circuit as described above and as shown in FIG. 5, placing an additional 330 picofarads across the output of the oscillator at 25 and 51 lowered the frequency by approximately 15 percent. However, the regulator circuit adjusted the oscillator amplitude so that the amplitude frequency product, as measured by an external circuit such as shown within the box 68, remained constant to within 0.1 percent.

As illustrated in FIG. 7, a more general concept is to take the output of a measurement circuit as a sum of one or more rectified currents derived from alternating currents through one or more fixed or variable capacitors, and to regulate the oscillator amplitude with similar rectified currents derived from alternating currents through one or more fixed or variable capacitance elements. The circuit of FIG. 7 arbitrarily shows a total of four capacitance elements, C1 through C4, connected between the oscillator output and eight diodes 81 through 88, terminating at lines C1+ through C4+ and C1— through C4—. The "C+" and "C—" lines may be connected in various manners to the "O" output line, the "G" ground line or the "A" amplifier regulator line. The RC filter in the amplifier regulator line, the D.C. amplifier and oscillator can be as shown in previous figures. Reference A is assumed to be a reference current supplied to the amplifier circuit at 79 as shown in FIG. 6 and reference B is an additional reference current which may be supplied to the output circuit at 89 in addition to that delivered by the capacitor diode circuits. As before, the output may be taken as a current into a low impedance load or as a voltage across the output circuit load resistance.

The large number of various possible connection patterns between the C lines and the O, G and A lines of FIG. 7 allow the generation of a wide variety of voltage and current functions of capacitance. Three such connection patterns are indicated in the connection charts set out in FIGS. 8, 9 and 10 in which the "C" terminals and "O," "G" and "A" lines correspond to the same lines in FIG. 7.

In FIG. 8, for example, C1 and C2 may be assumed to be the first and second variable capacitors of a first capacitance gage with the capacitance difference value $(C1-C2)$ corresponding to a first pressure, and C3 and C4 may be assumed to be the first and second variable capacitors of a second gage with the capacitance difference $(C3-C4)$ corresponding to a second pressure. Then, to generate an electrical output proportional to the ratio $(C1-C2)/(C3-C4)$, diode lines C1+ and C2− are connected to output line O, diode lines C1−, C2+, C3+, and C4− are connected to ground line G and diode lines C3−, and C4+ are connected to amplifier line A. The output current may then be expressed as $$[\alpha(C1-C2)+B]$$

where $\alpha$ is proportional to the product of the oscillator frequency and peak to peak output voltage, and B is the external reference current supplied to the output circuit at 89. Similarly, the current delivered to the amplifier control line will be $[-\alpha(C3-C4)+A]$, where A is the external reference current supplied to the amplifier line at 79 in FIG. 7. For balance, the total current delivered to the amplifier control line must equal zero. That is, reference current A must equal the rectified capacitor current $\alpha(C3-C4)$. Thus, $\alpha=A/(C3-C4)$. Substituting for the value of $\alpha$ in the previous expression, the output current may be expressed as $$\left[A\left(\frac{C1-C2}{C3-C4}\right)+B\right]$$

That is, the output current is equal to a first selected constant times the ratio of the capacitance differences plus or minus a second selected constant current.

For practical pressure or capacitance difference ratio measurements, circuit techniques for trimming the variable capacitance elements with additional capacitors to control the zero point and for driving various capacitors with different voltages, such as disclosed in subsequent figures, may be desirable.

As seen in FIG. 9, another arrangement, which I have used as an electrical output altimeter, is to connect line C4− to output line O, diode lines C1+, C2−, C3+ and C4 + to ground line G and diode lines C1−, C2+, and C3− to amplifier control line A. Capacitance elements C1 and C2 are assumed to be the two variable capacitors of a capacitance gage, and C3 and C4 are adjustable trimming capacitors which are used to adjust circuit parameters. Following the above reasoning used in connection with FIG. 8 the output current is seen to be $$\left[A\frac{C4}{(C1-C2)+C3}+B\right]$$

In this application, $C1-C2$ will be approximately proportional to pressure while the output current will be a highly adjustable nonlinear function of this difference. As seen from the expression, adjustments of the magnitude of reference current A and capacitance element C4 are equivalent. Three independent adjustments are available; C4 (or A), C3 and reference current B. The actual relationship of altitude to atmospheric pressure resembles a logarithmic function. However, with proper adjustment of these circuit parameters I have been able to generate currents proportional to altitude over a range of approximately 40,000 feet, a pressure range of approximately 6 to 1, with an accuracy of a few percent.

In another application for a flight data recorder, I wanted to generate a current precisely proportional to pressure differences, corrected for the slight inherent nonlinearity of the capacitance gage. For extremely small motions of the diaphragm of the gage of FIG. 1, the increase of the capacitance to one plate will be essentially equal to the decrease in capacitance to the other. However, as the diaphragm moves significantly closer to a fixed plate, the capacitance to that plate will increase more rapidly than the decrease in capacitance to the other plate. It was found that taking the value of one diaphragm to fixed plate capacitance and dividing by the sum of the two diaphragms to fixed plate capacitances would give a more linear measure of pressure (for a particular capacitance gage). This function was realized with the circuit of FIG. 7 as illustrated in FIG. 10 by connecting diode lines C1+ and C3− to output line O, diode lines C3+ to ground line G and diode lines C1− and C2− to amplifier line A. The output current was then $$\left[A\left(\frac{C1-C3}{C1+C2}\right)+B\right]$$

where C1 and C2 were the two capacitances of a gage and C3 was an adjustable trimmer capacitor to allow the current output to be trimmed to zero at nominal center value. C4 and its associated diodes were not used in this particular instance.

If desired, the general circuit of FIG. 7 may be used to provide two or more voltage and/or current outputs. For example, C1+ may be connected to a first output line and C1− to a first ground line; C2+ and C3+ to a second output line and C2− and C3− to a second ground line; C4+ connected to a system ground line compatible with the D.C. amplifier input and C4− to the amplifier control line. The current delivered by the circuit to the first output line with respect to the first ground line will then be proportional to $C1/C4$. The current delivered to the second output line with respect to the second ground line will be proportional to $(C1 + C3)/C4$.

In some instances it may be desirable to have one or more outputs of the circuit of FIG. 7 "floating" with respect to the amplifier control line and control amplifier ground potential. Since the diodes, C+ lines and C− lines are D.C. isolated from the oscillator circuit by capacitances, individual rectifier current outputs may be with respect to different D.C. grounds or reference levels. For example, in the case of the dual output configuration described above, the first ground line may be at a first reference potential, the second ground line at a second reference potential and these two reference potentials may or may not be equal to each other or to the ground level of the control amplifier. The output load circuit for each output is connected between the current output point and the corresponding ground.

Numerous other configurations and combinations are possible. In particular applications, where it is not necessary or desirable to vary the oscillator output in accordance with one or more capacitances or to regulate the oscillator output, the amplifier line and D.C. amplifier of FIG. 7 may be deleted and the oscillator powered from a convenient D.C. power source.

*Modulated Oscillator Circuits*

In the previously described circuits, the oscillator amplitude has been essentially constant or varying slowly in accordance with capacitor variations. The rectified D.C. or low frequency output of the capacitor diode circuit has been utilized directly or connected to D.C. amplifiers. Because of the well known problems of stable D.C. amplification, modulated oscillator circuits may be advantageous in certain applications.

FIG. 11 illustrates a first form of modulated oscillator circuit which I have used as a "pressure switch." In a particular circuit, which I have constructed, the oscillator of FIG. 11 is essentially the oscillator 67 of FIG. 5, the battery or D.C. power supply 91 has a voltage of from 10 to 15 volts and the A.C. source 92 supplies a voltage of sinusoidal wave form at approximately 100 cycles per second and of the order of 5 to 10 volts peak to peak. The power supplied to the oscillator is thus a pulsating D.C. consisting of superimposed D.C. and A.C. voltages. First variable capacitor 93 and second variable capacitor 94 form the elements of capacitance gage, while third variable capacitor 95 and fourth variable capacitor 96 are adjustable trimmer capacitors. Because the oscillator output is essentially proportional to the input power voltage, the resultant output is a 100 kilocycle "carrier" which is sinusoidally modulated at a frequency of 100 cycles per second at a modulation of the order of 30 to 70 percent. Since the rectified current output of the capacitor diode circuit across load resistor 97 is essentially proportional to the oscillator amplitude, the circuit output will be a pulsating current corresponding to the product of the capacitance values and the modulated oscillator output. This A.C. signal is then A.C. amplified at 100, synchronously demodulated with respect to the A.C. source at 101, and D.C. amplified at 102.

If the sum of capacitances 93 and 95 are greater than the sum of capacitances 94 and 96, the D.C. component of the capacitor diode circuit output current will be positive and the A.C. component will change in a positive direction as the oscillator amplitude increases. If the sum of capacitances 93 and 95 is less than the sum of capacitances of 94 and 96, the D.C. component of the output current will be negative and the A.C. component will change in a negative direction as the oscillator amplitude increases. Hence, both the A.C. and D.C. components of the capacitor diode circuit output current will indicate the magnitude and direction of the difference between capacitances 93 and 95 and capacitances 94 and 96. The magnitude of the A.C. current output indicates the magnitude of the capacitance difference and the phase with respect to the phase of the A.C. source indicates the direction of the capacitance difference.

Because the capacitance diode circuit of FIG. 11 acts as an A.C. current generator, the phase of the A.C. output voltage will depend on the nature of the circuit load impedance as well as the phase of the circuit output current. If the filter network 98 between the diode circuit and the A.C. amplifier 100 input presents an essentially resistive impedance to the diode circuit at the modulation frequency, the phase of the voltage applied to the A.C. amplifier 100 will be essentially that of the A.C. current output. If the filter capacitors are large so that the input impedance of the filter network at the modulation frequency is primarily capacitive, the A.C. voltage applied to the A.C. amplifier will lag phase of the diode circuit A.C. current output.

If desired, either the direct or amplified output of the demodulator 101 may be employed as a unidirectional output to indicate the magnitude and direction of the capacitance unbalance. However, in certain applications, it is sufficient to precisely indicate the direction of unbalance, and the magnitude of unbalance is of less importance. For example, such a unit can be employed as a warning device to indicate when an aircraft is being flown at an excessive dynamic pressure or indicated airspeed. In such an application, capacitances 93 and 94 are the two variable capacitances of a gage such as that of FIG. 1, the pressure chambers of which are pneumatically connected to pitot and static pressure lines. Capacitances 95 and 96 are adjustable trimmer capacitors which are used to adjust the circuit so that its balance point is at the pressure at which the warning is to be given. Then, so long as the capacitance unbalance is in one direction, a safe condition is indicated. A capacitance unbalance in the other direction indicates the hazardous condition. In such an application, the circuit of FIG. 11 is used to drive a relay or suitable D.C. signaling device such as at 99 from the D.C. amplifier 102 or directly from the demodulator 101. Alternately, the output of the A.C. amplifier 100 or the capacitor diode circuit can be connected to a phase sensitive A.C. signaling device. It may be noted that there are two demodulation or rectification processes in the circuit of FIG. 11. The first demodulation process is the rectification of the modulated 100 kilocycle (for example) oscillator output signal into the sum of a direct and alternating current by the capacitance diode rectifier circuit. The second is the demodulation of the low frequency alternating current or voltage signal output of the capacitance diode circuit, by the synchronous rectifier, into a D.C. signal whose polarity corresponds to the phase of the A.C. circuit output. A particular advantage of modulated oscillator circuits in such instances is that precision voltage, current or A.C. amplitude references, or stable amplifiers are not required. It is only necessary to sense the relative phase of the A.C. component of the capacitor diode circuit output.

FIG. 12 illustrates a second modified form of modulated oscillator circuit which may also be used as a pressure switch. In FIG. 12, the oscillator 67, D.C. source 91, A.C. source 92, filter network 98, and capacitors 93, 94, 95 and 96 can be the same as used in connection with FIG. 11. However, the capacitors 95 and 96 are connected to a filter input line 105 by diodes 106 and 107 respectively, and are connected to a return or ground line 108 by diodes 109 and 110, respectively rather than being directly in parallel with capacitors 93 and 94 as was the case in connection with FIG. 11.

The rectified current component due to alternating current passing through capacitance 95 is of the the same polarity as the rectified current component due to alternating current through capacitance 93. Similarly, the rectified current component due to alternating current through capacitance 96 is of the same polarity as the rectified current component due to alternating current through capacitance 94. Thus, capacitor 95 is essentially in parallel with capacitor 93 and capacitance 96 is essentially in parallel with capacitance 94.

As in the case of FIG. 11, capacitances 95 and 96 allow the circuit to be adjusted for a null output at the desired difference of capacitances 93 and 94.

Similar techniques may be used to sense if the ratio of two sets of capacitance differences is greater or less than a specified value. For example, FIG. 13 illustrates a circuit which I have constructed as a pressure ratio sensing switch. A D.C. source 91, an A.C. source 92, A.C. amplifier 100, synchronous demodulator 101 and D.C. amplifier 102 may be connected to the circuit of FIG. 13 to form a system similar to that of FIG. 11. Capacitors 111 and 112, in combination with variable capacitors 93 and 94, form a variable capacitive voltage divider which allows adjustment of the relative fraction of the oscillator output voltage which is applied to the common side of capacitors 93 and 94. Similarly, capacitors 113 and 114, in combination with variable capacitors 95 and 96, form a variable capacitive voltage divider which allows adjustment of the relative fraction of the oscillator output voltage applied to the common line of capacitors 94 and 95. For a given oscillator output amplitude and frequency product, the rectified current output of the circuit of FIG. 13 will be $$[A(C93-C94)+B(C95-C96)]$$

where A and B are constants corresponding to the relative magnitudes of the oscillator output voltage supplied to capacitors 93 and 94 and to capacitors 95 and 96 respectively.

If capacitances 93 and 94 are first and second variable capacitors of a first pressure gage of the type illustrated in FIG. 1 and capacitances 95 and 96 are first and second variable capacitors of a second such gage, we may consider $(C93-C94)$ as corresponding to a first pressure quantity P and $(C95-C96)$ as corresponding to a second pressure quantity $-Q$. The current output of the circuit of FIG. 13 will then be $(AP-BQ)$. Then, if the ratio $P/Q$ is greater than the ratio of $B/A$ the D.C. and A.C. output current components of the circuit of FIG. 13 will be of one polarity and phase. If the ratio $P/Q$ is less than the ratio of $B/A$ the output polarity and phase will be of the opposite sign. Since the output of the circuit of FIG. 13 is a linear combination of pressure values, it cannot provide a signal directly proportional to pressure ratio. However, it can be of use in applications where the primary requirement is to determine whether a pressure ratio is above or below a specified value. For example, such a device can be used as a warning instrument on high speed aircraft to indicate when a given pitot-static pressure ratio is being exceeded and hence when a specified Mach number is being exceeded. In many instances, only one of the capactive voltage dividers will be required. For example, capacitors 113 and 114 can be deleted and the oscillator output connected directly to common line of capacitances 95 and 96. The sensed ratio is then controlled by adjustment of capacitors 111 and 112. Similarly, capacitors 111 and 112 can be deleted, the oscillator output connected directly to the common line of capacitors 93 and 94, and the sensed ratio controlled by adjustment of capacitors 113 and 114. When the circuit of FIG. 13 is used for the measurement of pressure ratio, it will generally be desired to construct the two pressure gages so as to have the relative gage sensitivities (capacitance change per unit pressure change) approximately proportional to the ratio which is to be sensed. The capacitive voltage dividers are then used as a fine trimming adjustment. Additional trimming capacitances, for example, paralleling capacitors 93, 94, 95 and 96 in the manner shown in FIGS. 11 and 12 will usually be desirable but are not specifically shown in FIG. 13.

FIG. 14 illustrates a second modified form of ratio sensing circuit. As before, a D.C. source 91, an A.C. source 92, A.C. amplifier 100, synchronous demodulator 101 and D.C. amplifier 102 similar to those shown in FIG. 11 will be used to form a complete system. Capacitors 121 and 122 are the variable capacitors of a first capacitance pressure gage and capacitors 123 and 124 are the variable capacitors of a second capacitance pressure gage. The capacitors of each gage are connected to a diode network such as the one shown in FIG. 3. In the circuit of FIG. 14, the first or upper capacitor gage diode circuit will generate direct and alternating current components proportional to $$(C121-C122)$$

while the second or lower capacitance gage diode circuit will generate direct and alternating current components proportional to $(C123-C124)$. If the two primary windings 126 and 127 of the transformer 125 are of equal numbers of turns, the circuit null will occur when the alternating current generated by the first and second capacitance gage diode circuits are equal. A greater alternating current of a given phase polarity generated by the first or upper circuit will result in an A.C. signal of a first phase polarity being transmitted to the A.C. amplifier 100. If the alternating current of a given phase generated in the first or upper circuit is less than that generated by the second or lower circuit, the voltage across the transformer secondary 128 will be of opposite phase polarity.

If the two transformer primaries are of different numbers of turns, the circuit null will be at a corresponding current ratio. For example, if the lower transformer primary winding 126 has twice the number of turns of the upper primary winding 127, the circuit null will occur with the current generated by the upper capacitance diode circuit of twice the magnitude of the alternating current generated by the lower capacitance diode circuit. Then, output currents of greater than the (for example) two to one primary turns ratio will result in an A.C. signal of one phase polarity across the transformer secondary 128 while a current ratio of less than two to one will result in an A.C. signal across the transformer secondary of the opposite phase.

Capacitance attenuators such as those shown in FIG. 13 between the oscillator and capacitors 121, 122, 123 and 124, and various other trimming capacitors such as shown in FIGS. 11 and 12 can be added to the circuit of FIG. 14 if desired.

*Self-balancing system*

FIG. 15 illustrates a capacitance self-balancing system which can be employed as a mechanical positioning servo or in other applications. Capacitors 131 and 132 are the first and second variable capacitors of a pressure gage of the type as illustrated in FIG. 1, or are some other suitable variable capacitances. Capacitors 133 and 134 are adjustable capacitors such as conventional rotary variable air capacitors, for example, and are mechanically connected to an A.C. motor 135 through gearing or some other suitable mechanical transmission as is schematically indicated by dotted line 136. The filter network 98 can be the same as illustrated in FIG. 11 as can be oscillator 67, the D.C. source 91, the A.C. source 92, and the A.C. amplifier 100.

The signal delivered to the filter 98 and the A.C. amplifier 100 is a sum of signals generated by the upper and lower capacitance diode networks. The upper capacitance diode circuit generates an alternating current component corresponding to the differences between the capacitance of capacitors 131 and 132. The lower capacitance diode circuit generates an alternating current component corresponding to the difference between the capacitance of capacitors 133 and 134. If the difference between capacitors 133 and 134 does not correspond to the difference between capacitors 131 and 132, a net A.C. error signal will be delivered to the filter 98, A.C. amplified by the amplifier 100, and applied to the A.C. motor 135. The A.C. motor acts as a form of synchronous demodulator whose output is a mechanical rotation of its shaft and consequently of the capacitors 133 and 134. With proper attention to phases and polarities, the A.C. motor 135 will adjust capacitances 133 and 134 so that their difference will correspond to and will track the difference between capacitors 131 and 132.

What is claimed is:

1. Capacitor comparator circuitry comprising first network including first and second capacitors which are variable relative to each other, said first capacitor being connected for conduction between a first input terminal and a first junction and said second capacitor being connected for conduction between said first input terminal and a third junction, first, second, third and fourth diodes all connected for conduction in the same direction in a closed series loop with a second input terminal on said loop between the first and second diodes, said first junction being on said loop between the second and third diodes, a second junction on said loop between the third and fourth diodes and said third junction being on said loop between the fourth and first diodes, a base load connected between said second input terminal and second junction, alternating voltage supply means having output and base potential terminals for supplying power to said first and second input terminals comprising an oscillator having a signal input, output and base potential terminals, said output being amplitude-controlled by a unidirectional voltage input signal, an amplifier having an input summing point and a unidirectional voltage output coupled to the oscllator signal input for supplying signal input thereto, at least one network energized by the oscillator output, said network comprising a capacitor, having first and second terminals, said first terminal being energized by the oscillator output, said capacitor being of a size such that it is subtsantially fully recharged by each cycle of alternating current imposed thereon, current carrying means coupled to said capacitor second terminal for conduction of capacitor charge and discharge cycles to said base potential and summing point, respectively, and a unidirectional voltage reference connected for conduction to said summing point, whereby said alternating voltage supply means output amplitude is controlled by a summation of currents from said reference and network currents.

2. The capacitor comparator circuitry of claim 1 further characterized in that the first input terminal is grounded.

3. The capacitor comparator circuitry of claim 1 further characterized in that the second input terminal is grounded.

4. The capacitor comparator circuitry of claim 1 further characterized in that said oscillator is a resonant oscillator having a resonant frequency determining circuit including said first and second capacitors.

5. The capacitor comparator circuitry of claim 1 further characterized in that the alternating voltage supply means comprises a higher frequency modulated by a lower frequency alternating voltage and said base load is connected in parallel with a circuit including a demodulator connected to an output load.

6. The capacitor comparator circuitry of claim 1 further characterized in that the lower frequency alternating voltage is connected in series with a unidirectional voltage source.

7. The capacitor comparator of claim 1 further characterized in that the alternating voltage supply comprises a high frequency carrier of said higher frequency which is modulated at said lower frequency, the modulation being in the order of 30 to 70 percent.

8. The capacitor comparator circuitry of claim 1 further characterized in that an adjustable third capacitor is connected between the first input terminal and the first junction and an adjustable fourth capacitor is connected between said first input terminal and said third junction.

9. The capacitor comparator circuitry of claim 1 further characterized in that said first and second capacitors are relatively varied by pressure.

10. The capacitor comparator circuitry of claim 1 further characterized in that a second network corresponding to the first network is provided, the second junctions of the first and second networks being connected together, adjustable feeder capacitors connected between the first input terminal of each network and said voltage supply means and an adjustable bypass capacitor connected between said first and second input terminals.

11. The capacitor comparator circuitry of claim 1 further characterized in that fourth and fifth junctions are provided, adjustable fourth and fifth capacitors connected, respectively, between the first input terminal and said fourth and fifth junctions, a fifth diode connected for conduction from the fourth to the second junctions, a sixth diode connected for conduction from the second input terminal to the fourth junction, a seventh diode connected for conduction from the second junction to the fifth junction and an eighth diode connected for conduction from the fifth junction to the second input terminal.

12. The capacitor comparator circuitry of claim 1 further characterized in that a second network corresponding to the first network is provided, said first and second networks being connected in parallel between the voltage supply means and second input terminals.

13. The capacitor comparator circuitry of claim 12 further characterized in that the first and second capacitors of each network are varied by pressure.

14. The capacitor comparator circuitry of claim 12 further characterized in that said base load includes a servomotor connected to the first and second capacitors of the second network for varying them.

15. The capacitor comparator circuitry of claim 1 further characterized in that a second network corresponding to the first network is provided, an output transformer having first and second primary windings connected, respectively, to the second input and second junction of the first and second networks, and a secondary winding providing output terminals for connection to said base load.

16. The capacitor circuitry of claim 15 further characterized in that said first and second primary windings have equal number of turns.

17. The capacitor circuitry of claim 15 further characterized in that said first and second primary windings have unequal number of turns.

18. The subcombination, an alternating voltage supply means having output and base potential terminals for supplying power to first and second input terminals comprising an oscillator having a signal input, output and base potential terminals, said output being amplitude-controlled by a unidirectional voltage input signal, an amplifier having an input summing point and a unidirectional voltage output coupled to the oscillator signal input for supplying signal input thereto, at least one network energized by the oscillator output, said network comprising a capacitor, having first and second terminals, said first terminal being energized by the oscillator output, said capacitor being of a size such that it is substantially fully recharged by each cycle of alternating current imposed thereon, current carrying means coupled to said capacitor second terminal for conduction of capacitor charge and discharge cycles to said base potential and summing point, respectively, and a unidirectional voltage reference connected for conduction to said summing point, whereby said alternating voltage supply means output amplitude is controlled by a summation of currents from said reference and network currents.

19. Capacitor comparator circuitry comprising a plurality of networks each comprising capacitor means having two connections, one of which is connected to an input terminal common to all of said networks and the other of which is connected to an internal junction of said network, and first and second network component output terminals, a first diode connected for conduction from the internal junction of the network to the first network output terminal, and a second diode connected for conduction from the second network output terminal to said internal junction, an output circuit having an input terminal connecting through an output load to a base potential, and a feed-back control input terminal, and said base potential, an alternating current supply source connected to the input terminal common to said network and said base potential, a regulator for said source connected to said source and to said feed-back control input terminal for regulating said source, the first and second output terminals of the networks being connected to the output circuit input terminal, base potential and said feed-back cotrol input terminal.

20. The capacitor comparator circuitry of claim 19 further characterized in that there are four networks and the first output terminal of the first network and second output terminal of the second network are connected to the input terminal of the output circuit, the second output terminal of the first and fourth networks and first output terminal of the second and third networks are connected to the base potential of the output circuit, and the second output terminal of the third network and first output terminal of the fourth network are connected to the feed-back control input terminal.

21. The capacitor comparator circuitry of claim 19 further characterized in that there are four network components and the first output terminals of each of the first, third and fourth networks and the second output terminal of the second network are connected to base potential of the output circuit, the first output terminal of the second network and the second output terminals of the first and third networks are connected to the feed-back control input terminal, and the second output terminal of the fourth network is connected to the input terminal of the output circuit.

22. The capacitor comparator circuitry of claim 19 further characterized in that there are three networks and the first output terminal of the first network and the second output terminal of the third network are connected to the input terminal of the output circuit, the first terminal of the second and third networks are connected to base potential of the output circuit, and the second terminals of each of the first and second networks are connected to the feed-back control input terminal.

References Cited by the Examiner

UNITED STATES PATENTS

| | | | |
|---|---|---|---|
| 2,452,244 | 10/1948 | Knudsen | 324—140 X |
| 2,485,579 | 10/1949 | Elliott | 324—61 |
| 2,581,085 | 1/1952 | Edelman | 324—60 X |
| 2,696,566 | 12/1954 | Lion et al. | |
| 2,854,633 | 9/1958 | DeJager | 324—119 X |
| 2,922,959 | 1/1960 | Holloway et al. | 332—47 |
| 2,934,700 | 4/1960 | Holaday et al. | 324—61 |
| 2,972,106 | 2/1961 | Hyrne | 324—57 |
| 3,031,614 | 4/1962 | Calvert | 324—57 |
| 3,032,722 | 5/1962 | Banasiewicz | 331—110 |
| 3,039,051 | 6/1962 | Locher | 324—61 |
| 3,119,267 | 1/1964 | Bartky | 324—61 X |
| 3,134,947 | 5/1964 | Charasz | 331—183 X |
| 3,142,016 | 7/1964 | Minter | 324—61 |
| 3,142,985 | 8/1964 | Seaver | 73—233 |
| 3,197,701 | 7/1965 | Sangl et al. | 324—119 X |

WALTER L. CARLSON, *Primary Examiner.*

E. KUBASIEWICZ, *Assistant Examiner.*

UNITED STATES PATENT OFFICE
CERTIFICATE OF CORRECTION

Patent No. 3,271,669                      September 6, 1966

Tenny Lode

It is hereby certified that error appears in the above numbered patent requiring correction and that the said Letters Patent should read as corrected below.

Column 6, line 8, for "conected" read -- connected --; column 8, line 46, for "$(C1+C3)/C4$" read -- $(C2+C3)/C4$ --.

Signed and sealed this 1st day of August 1967.

(SEAL)
Attest:

Edward M. Fletcher, Jr.                      EDWARD J. BRENNER

Attesting Officer                            Commissioner of Patents